United States Patent
Hollemann et al.

[15] 3,660,059
[45] May 2, 1972

[54] FUEL GAS COMPOSITION

[72] Inventors: Robert A. Hollemann; Robert F. Huston; Cyril A. Barrios, all of Baton Rouge, La.

[73] Assignee: The Dow Chemical Company, Midland, Mich.

[22] Filed: Apr. 13, 1970

[21] Appl. No.: 28,078

[52] U.S. Cl. ..........................................48/197 FM, 252/407
[51] Int. Cl. .........................................B01j 1/16, C10c 3/06
[58] Field of Search ......................44/52; 48/197 FM; 148/9; 260/666.5; 252/407, 372

[56] References Cited

UNITED STATES PATENTS

| | | | |
|---|---|---|---|
| 2,951,750 | 9/1960 | White | 44/52 X |
| 3,226,213 | 12/1965 | Nelson et al. | 44/52 X |
| 3,352,652 | 11/1967 | Belfit | 48/197 FM |

*Primary Examiner*—Daniel E. Wyman
*Assistant Examiner*—W. J. Shine
*Attorney*—Griswold & Burdick, Jerome L. Jeffers and William R. Norris

[57] ABSTRACT

Disclosed is a composition of matter useful as a fuel gas. The composition comprises a first component selected from methylacetylene, propadiene and mixtures thereof in admixture with dimethyl ether as a second component. The dimethyl ether preferably comprises at least about 25 mole percent of the composition. The composition is safely storable under pressure due to the stability against spontaneous decomposition of the unsaturated hydrocarbons afforded by the dimethyl ether. Additionally, the composition maintains an essentially constant composition upon withdrawal from storage.

10 Claims, No Drawings

FUEL GAS COMPOSITION

BACKGROUND OF THE INVENTION

When relatively small amounts of energy are added to certain pressurized, unsaturated hydrocarbons, e.g., acetylene, methylacetylene and propadiene, the hydrocarbon may become unstable and undergo rapid decomposition. This hazard of explosion depends upon temperature, pressure, concentration and the presence of other materials which may be reactive or catalytic. One known method to avoid this hazard is that of dilution of the unsaturated hydrocarbon with a more stable compound, although stability of the mixture is not reliably predicted by the known stability of the diluent. Various properties of a diluent must be evaluated in determining its suitability for use. The diluent may lower the value of the mixture as a fuel gas to an unacceptable level and where an appreciable difference in vapor pressure of the liquified components exists the composition may change appreciably during use of the pressurized container contents resulting in wide fluctuations in heat values and/or hazardous concentrations of unsaturated hydrocarbons.

U.S. Pat. No. 3,226,213 discloses a fuel gas composition wherein three and four carbon hydrocarbons are simultaneously employed as diluents to stabilize methylacetylene and/or propadiene. The use of two diluents is necessitated by the differences in vapor pressure of the materials and the need to maintain the concentration of the unsaturated hydrocarbons within a certain range. When gas is removed from a pressure vessel containing the liquified hydrocarbon mixture an equilibrium flash distillation called "weathering" occurs. The three carbon diluent distills at a faster rate and the four carbon diluent distills at a lower rate than the methylacetylene and/or propadiene. The combination of diluents thus provides for a fairly uniform composition of unsaturated hydrocarbon during withdrawal of the container contents.

It is a principal object of the present invention to provide a novel fuel gas composition comprising methylacetylene and/or propadiene which is stable to spontaneous decomposition.

It is a further object to provide such a composition which comprises methylacetylene and/or propadiene in admixture with a single component as stabilizer.

An additional object is to provide such a composition which remains relatively constant throughout withdrawal from its storage vessel.

SUMMARY OF THE INVENTION

The present invention is a fuel gas composition which comprises methylacetylene and/or propadiene together with dimethyl ether as a stabilizer. The dimethyl ether is preferably employed in an amount sufficient to provide at least about 25 mole percent of the total composition.

DETAILED DESCRIPTION OF THE INVENTION

The fuel gas composition of the present invention preferably contains from about 25 to 50 mole percent dimethyl ether as stabilizer with the remainder of the composition being made up of methylacetylene and/or propadiene At concentrations of ether above about 50 percent the efficiency of the composition as a fuel gas is reduced. At stabilizer concentrations below about 25 percent the composition is not as stable as those having ether concentrations within the preferred range. At dimethyl ether concentrations within the preferred range the composition is extremely stable and highly effective as a fuel gas.

Dimethyl ether is an especially useful stabilizer for the methylacetylene/propadiene fuel gas. When burned it is completely converted into carbon dioxide and water yielding no harmful by-products. The composition of a dimethyl ether stabilized methylacetylene/propadiene mixture changes very little as the gas mixture is removed from a pressurized storage vessel. The advantages of a relatively constant composition are realized with the composition of the present invention.

While the relative proportions of methylacetylene and/or propadiene and ether are not critical, a preferred embodiment is prepared by combining 39 to 63 mole percent methylacetylene, 9 to 28 mole percent propadiene and 25 to 50 mole percent dimethyl ether. These gases are normally premixed and injected into a gas pressure vessel under sufficient pressure to liquify the mixture.

Mixing dimethyl ether with methylacetylene and/or propadiene in the proportions specified herein, provides an effective method of stabilizing the fuel gas. Alternatively other stabilizers such as propane, propylene, isobutane and n-butane can be mixed with the ether to provide a fuel gas containing no greater than about 75 percent actives. For example a composition made up of 75 percent or less methylacetylene and/or propadiene as a first component along with 25 percent or more of a second component made up of three and four carbon hydrocarbon stabilizers together with dimethyl ether would be stable. When a mixture of stabilizers is used, dimethyl ether is normally the major component of the stabilizer. Accordingly, such a composition, i.e., one containing at least about 25 percent stabilizer, would contain at least about 13 percent ether.

The invention is further illustrated by the following examples:

EXAMPLE I

The stability of methylacetylene in combination with varying amounts of other components as stabilizers was compared in the following manner:

A steel bomb was fabricated from two weld caps, and fitted with spark plugs in a manner so that the spark gap protruded into the sphere encompassed by the weld caps. Three spark plugs, with 1-inch lengths of 30 gauge platinum wire silver-soldered across their electrodes, were used to dissipate the energy supplied by a bank of capacitors totaling 10 microfarads charged to approximately 1,400 volts to discharge 100 joules of energy. The bomb was equipped with a dynamic strain gage pressure recorder for measuring both static pressure and rapid changes in pressure.

After the circuit and bomb had been made electrically and mechanically operational, the bomb was purged several times with nitrogen to insure complete oxygen removal. The bomb was then evacuated and loaded with the mixture to be tested to a recorded pressure of 220 psig at 68° C. After the above conditions of temperature and pressure had been reached and held for one minute, the power was switched on and the system fired, releasing 100 joules of energy across the platinum wire of one spark plug.

The pressure recorder was observed during the firing of the ignition circuit. If a sudden pressure rise of at least 50 psi was noted, the gas was considered to have failed the test. If no pressure rise was noted, the test was repeated using one of the other spark plugs. If no pressure rise was noted after the third firing, the gas was considered to have passed the stability test.

Methylacetylene in admixture with various amounts of other compounds as stabilizer was tested as described above. Table I sets out the results of stability tests of the various mixtures which were all vapors under the test conditions.

It is to be understood that the above-described test is quite severe and the fact that the gas containing 22.5 percent dimethyl ether decomposed upon being subjected to 100 joules of energy does not indicate that no stabilization was afforded at this level. Dimethyl ether will have a stabilizing influence on the composition at any level, but levels above about 25 percent are preferred to insure a high level of stability.

TABLE I

| Stabilizer | Mole % Stabilizer in Mixture | Result of Ignition Test |
| --- | --- | --- |

| | | |
|---|---|---|
| Dimethyl Ether | 22.5 | Failed |
| Dimethyl Ether | 25 | Passed/stable |
| Butane | 25 | Passed/stable |
| Propane | 25 | Failed |
| Ethane | 25 | Failed |
| Ethane | 31 | Failed |
| Methane | 33.5 | Failed |
| $C_2F_6$ | 25 | Failed |
| $CF_4$ | 25 | Failed |
| $C_2F_6$ | 31 | Failed |
| $CF_4$ | 31 | Failed |

The data of Table I illustrates that the stability of the stabilizer to be employed, which is predictable, (e.g., from heat of formation) is not reliably used in predicting the stability of the stabilizer $C_3H_4$ mixture. For example, dimethyl ether is shown to be a better stabilizer for $C_3H_4$ than $C_2F_6$ and $CF_4$ which are two of the most stable compounds known.

EXAMPLE II

A gas mixture comprising propadiene and dimethyl ether in which the ether accounted for 25 mole percent of the composition was tested in a manner similar to that of Example I. The mixture passed the 100 joule ignition test and was deemed stable.

EXAMPLE III

A cylinder containing a composition consisting of 55.2 percent methylacetylene, 11.0 percent propadiene and 33.6 percent dimethyl ether was weathered to 100 percent depletion over a temperature range of 10° to 30° C and a withdrawal rate range of 0.5 to 3 lbs./hr. Samples of the liquid and vapor were taken at various weight percent depletions and analyzed by gas phase chromatography.

Table II sets out the composition of both the liquid and vapor phases of the composition at various stages during its depletion.

TABLE II.—WEATHERING OF DIMETHYL ETHER STABILIZED $C_3H_4$

| Wt. percent depletion | 0 | 9 | 28 | 46.5 | 70 | 86 | 89 | 92 | 99 |
|---|---|---|---|---|---|---|---|---|---|
| Vapor phase composition, mole percent: | | | | | | | | | |
| (a) Methylacetylene | 52.5 | 52.0 | 53.8 | 53.5 | 55.5 | 56.2 | 57.0 | 57.2 | 57.9 |
| (b) Propadiene | 16.0 | 15.6 | 14.2 | 12.5 | 10.5 | 7.4 | 6.0 | 5.7 | 2.9 |
| (c) Dimethyl ether | 29.5 | 30.5 | 31.5 | 33.6 | 33.6 | 36.5 | 36.5 | 37.1 | 39.2 |
| Liquid phase composition, mole percent: | | | | | | | | | |
| (a) Methylacetylene | 55.2 | 55.5 | 56.0 | 56.3 | 56.6 | 55.6 | 57.2 | | |
| (b) Propadiene | 11.0 | 9.0 | 7.5 | 7.0 | 6.2 | 7.0 | 3.7 | | |
| (c) Dimethyl ether | 33.6 | 31.3 | 35.5 | 35.6 | 36.2 | 37.0 | 38.1 | | |

The data of Table II illustrates the relatively small change in dimethyl ether concentration over the range of from 0 to 100 percent depletion.

Cutting tests were performed at the different depletion percentages comparing the above mixtures to a commercially available cutting gas having the following composition at 0 percent depletion:

Methylacetylene — 38.2%
Propadiene — 26.9%
Propylene — 7.8%
Propane — 18.4%
Butane — 8.7%

The tests were conducted at the same cutting speeds, oxygen pressure and gas pressure. The above blends were found to be nearly identical in cutting performance to the commercially available gas.

We claim:

1. A fuel gas composition which comprises methylacetylene, propadiene or mixtures thereof as a first component together with a stabilizing amount of dimethyl ether as a second component to stabilize the composition against spontaneous decomposition.

2. The fuel gas of claim 1 wherein the dimethyl ether comprises at least about 25 mole percent of the composition.

3. The fuel gas of claim 1 containing 39 to 63 mole percent methylacetylene, 9 to 28 mole percent propadiene and 25 to 50 mole percent dimethyl ether.

4. A method for producing heat and light which comprises burning as a fuel gas a composition comprising methylacetylene, propadiene or mixtures thereof as a first component together with a stabilizing amount of dimethyl ether as a second component to stabilize the composition against spontaneous decomposition.

5. The method of claim 4 wherein the dimethyl ether is employed in an amount sufficient to provide at least about 25 mole percent of the mixture.

6. The method of claim 4 wherein the dimethyl ether is employed in an amount sufficient to provide from 25 to 50 mole percent of mixture.

7. The method of claim 4 wherein the fuel gas contains from 39 to 63 mole percent methylacetylene, 9 to 28 mole percent propadiene and the dimethyl ether is employed in an amount sufficient to provide from 25 to 50 mole percent of the composition.

8. The method of claim 4 wherein dimethyl ether in admixture with one or more of the group of propane, propylene, isobutane or n-butane is admixed with the methylacetylene propadiene or mixtures thereof in an amount sufficient to provide at least about 25 mole percent of the composition and wherein dimethyl ether is employed in an amount sufficient to provide at least about 13 mole percent of the composition.

9. A fuel gas composition which comprises methylacetylene, propadiene or mixtures thereof as a first component together with dimethyl ether as a second component wherein the dimethyl ether makes up from 25 to 50 mole percent of the composition.

10. A fuel gas composition which comprises methylacetylene, propadiene or mixtures thereof as a first component together with dimethyl ether is admixture with one or more of the group of propane, propylene, isobutane or n-butane as a second component said fuel gas being further identified in that the first component makes up at least about 75 mole percent of the composition and the second component makes up at least about 25 mole percent of the composition and is made up of at least about 13 mole percent dimethyl ether.

* * * * *